United States Patent [19]

Fukushima et al.

[11] Patent Number: 4,889,697
[45] Date of Patent: Dec. 26, 1989

[54] METHOD OF REFINING FERROUS ION-CONTAINING ACID SOLUTION

[75] Inventors: Tsutomu Fukushima; Tsugio Nakao, both of Tokyo; Kasane Yamashita, Kawasaki; Takao Komuro, Hoya; Katsuhiro Nishi, Yokohama, all of Japan

[73] Assignees: NKK Corporation; Kokan Mining Co., Ltd., both of Tokyo, Japan

[21] Appl. No.: 280,378

[22] Filed: Dec. 5, 1988

[30] Foreign Application Priority Data

Dec. 10, 1987 [JP] Japan .................. 62-312637

[51] Int. Cl.$^4$ .................. C01G 49/04; C01G 49/06
[52] U.S. Cl. .................. 423/140; 423/55; 423/65; 423/101; 423/122; 423/277; 423/632; 423/633; 423/DIG. 1; 423/DIG. 2; 75/108; 75/109; 75/121
[58] Field of Search .................. 75/109, 108, 121; 423/DIG. 1, DIG. 2, 55, 65, 101, 122, 277, 632, 633

[56] References Cited

U.S. PATENT DOCUMENTS 2,623,849 12/1952 Peterson .................. 423/DIG. 1
3,682,592 8/1972 Kovacs .................. 423/DIG. 1

FOREIGN PATENT DOCUMENTS 51-14898   5/1976  Japan .
58-151335  9/1983  Japan .
59-73439   4/1984  Japan .
1404586    9/1975  United Kingdom ......... 423/DIG. 2

Primary Examiner—Robert L. Stoll
Attorney, Agent, or Firm—Frishauf, Holtz, Goodman & Woodward

[57] ABSTRACT

According to the subject method of refining a ferrous ion-containing acid solution, a metal selected from a group including Al, Cr, V, B, and Zn or an acid solution of that metal is added to a ferrous ion-containing acid solution, such as an acid solution which remains after steel is washed with an acid. The pH value of the acid solution is controlled to be within the range of 3.5 to 6 by adding an alkali liquid to the acid solution, whereby a hydroxide salt of the added metal is produced in the acid solution and the impurities in the acid solution are captured by the produced hydroxide salt. As a result, the impurities can be eliminated from the acid solution such that the Si component (e.g., $SiO_2$) content in the acid solution is within the range of 2 to 3 ppm or less. Since the content of the other impurities such as Al, Ti, and Cr can also be reduced, a high-purity iron oxide can be obtained from the resultant acid solution.

11 Claims, 2 Drawing Sheets

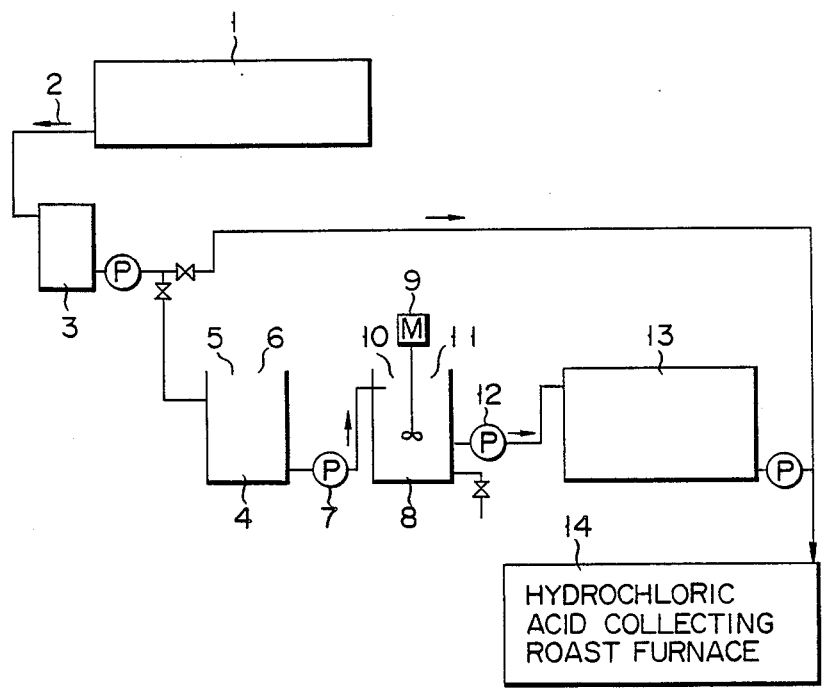
F I G. 1

METHOD OF REFINING FERROUS ION-CONTAINING ACID SOLUTION

BACKGROUND OF THE INVENTION

1. Field of the Invention

The present invention relates to a method of refining a ferrous ion-containing acid solution, and more particularly to a method which is used for eliminating impurities (such as silicon) from an iron ion-or iron salt-containing acid solution (such as a waste liquid which remains after steel is washed with a hydrochloric acid), so as to obtain a high-purity iron oxide.

2. Description of the Related Art

A waste liquid which remains after steel is washed with a hydrochloric acid (such a liquid will be hereinafter referred to simply as a "waste liquid") includes not only iron components but also impurities such as silicon, as is shown in Table 1 below.

TABLE 1

| | Fe | $SiO_2$ | Mn | Al | Cr | Free-HCl |
|---|---|---|---|---|---|---|
| Waste liquid remaining after washing steel with acid | 10~12% | 80~110 ppm | 250~290 ppm | 45~50 ppm | very small amount~5 ppm | 1.5~2.2% |
| Recovered Iron oxide | $Fe_2O_3$ 93~96% | $SiO_2$ 0.045~0.06% | Mn 0.18~0.22% | Al 0.022~0.03% | Cr <0.002 | Cl— 0.1~0.3% |

(note)
%: percentage by weight

Normally, a hydrochloric acid is recovered from the waste liquid by a roasting process, and the iron oxide powder ($\alpha$-$Fe_2O_3$) produced secondarily to the hydrochloric acid recovery is utilized for obtaining ferrite. However, since the waste liquid includes impurities, the iron oxide powder also includes them. For example, the $SiO_2$ content in the iron oxide powder is in the range of 0.04 to 0.06% by weight.

In order to obtain high-quality ferrite, it is necessary to improve the purity, the grain size and other characteristics of the iron oxide powder. To obtain high-class soft ferrite, in particular, the iron oxide powder should be as pure as possible, and its $SiO_2$ content, for example, should be not more than 0.01% by weight and preferably within the range of 0.005 to 0.007% by weight or less.

In a widely-adopted conventional method for producing such a high-purity iron oxide, purification of an iron hydroxide is performed when the iron hydroxide is crystallized by adding an alkali liquid to an iron sulfate solution, and the resultant high-purity iron hydroxide is thermally oxidized for deriving a high-purity iron oxide. More specifically, in the conventional method, an iron salt-crystallizing step is repeated under the same condition, or is combined with that performed under different conditions, so as to obtain a high-purity iron oxide. However, this conventional method does not allow recovery of an acid in many cases. In addition, it requires a complicated process, due to the inclusion of the step of crystallizing the iron salt and the step of thermally oxidizing the iron salt, so that production of a high-purity iron oxide requires a high cost.

In recent years, new roasting processes has been developed, so as not only to recover a hydrochloric acid from a waste liquid but also to produce a high-purity iron oxide at a low cost. According to the new methods, the waste liquid is subjected to a roasting process after silicon components are eliminated therefrom mainly in the form of $SiO_2$. These new methods are disclosed in the following references, for example:

Japanese Patent Publication No. 59-73439 discloses a method wherein a waste liquid is ultrafiltered to eliminate silicon components therefrom and is then subjected to a roasting or crystallizing process. However, this method has the problem that the grain size of silica ions eliminatable from the waste liquid is limited, so that it is difficult always to control the $SiO_2$ content in a-$Fe_2O_3$ to be less than 0.01% by weight. In addition, since the productivity of the method is not good, due to the principle of the ultrafiltration. In the light of economical points, it is practically impossible to eliminate silicon components from all amount of the waste liquid.

Japanese Patent Publication No. 58-151335 discloses a method wherein a cationic polymer coagulant is added to a waste liquid, to thereby cause the silicon components ($SiO_2$) to coagulate, and then the waste liquid is ultrafiltered. However, since this method utilizes ultrafiltration as in the method noted above, its productivity is not good, either.

Japanese Patent Disclosure No. 51-14898 discloses a method wherein a waste liquid is neutralized by adding an alkali solution thereto, thereby producing a ferrous hydroxide, a ferric hydroxide, or a mixture of these, and the silicon components in the waste liquid are filtered out after they are coprecipitated with the iron hydroxides. In this method, however, the silicon components are not coprecipitated with high efficiency. Therefore, the iron hydroxides must be produced such that they account for 8 to 10% by weight of the waste liquid. As a result, the amount of iron oxide obtainable will be lost in an amount corresponding to the produced iron hydroxides.

As mentioned above, the methods available at present do not simultaneously enable both high efficient impurity (e.g., Si) elimination from a waste liquid and low-cost production of a high-purity iron oxide.

SUMMARY OF THE INVENTION

Accordingly, an object of the present invention is to provide a method of refining a ferrous ion-containing acid solution, which can reduce the $SiO_2$ content in a waste liquid to 3 to 4 ppm or less, which can also reduce, or prevent an increase of, the other impurities such as Cr, Al, Ti and so on, and which can process all amount of the waste liquid with high efficiency.

To achieve this object, the method provided by the present invention comprises the following three steps:

the first step of adding at least one metal element selected from a group including Al, Cr, V, B, and Zn or its acid solution to a ferrous ion-containing acid solution, and dissolving the added metal element uniformly in the ferrous ion-containing acid solution;

the second step of adding alkali solution to the liquid obtained by the first step such that the liquid is neutralized to an appropriate pH value determined by the added metal element, thereby crystallizing a hydroxide of the added metal element; and the third step of adding one or two kinds of coagulants (anionic, nonionic, or both) to the liquid obtained by the second step, thereby coagulating the crystallized hydroxide of the added metal element for precipitation and separation.

The metal or its acid solution of the present invention have a solubility which changes greatly in response to a change in the pH value of an acid solution and have a very small solubility as the residue. In the present invention, the addition of such a metal or metals to an acid solution is combined with the pH value control of the acid solution, and this combination constitutes the principle underlying the present invention.

An example of the ferrous ion-containing acid solution used in the first step of the present invention is a waste liquid which remains after steel is washed with a hydrochloric acid.

In the second step, the metal or metals added to the ferrous ion-containing acid solution are crystallized in the form of e.g., $Al(OH)_3$ or $Cr(OH)_3$, by neutralizing the acid solution. This crystallization progresses, with impurity particles and oxide ions, such as $SiO_2$ and $(SiO_4-)n$ [n: 1 to 5] suspending or dissolving in the acid solution, as a kernel. Therefore, the impurity particles and oxide ions capture or polymerize each other as a result of the crystallization. At the time of the neutralization, the pH value of the acid solution is controlled not to exceed 6; it is kept preferably within the range of 3.5 to 6 since within this range no iron hydroxide is produced.

In the third step, one or two kinds of coagulants (anionic, nonionic, or both) are added to the liquid obtained by the second step. As a result, the colloidal-state crystallized particles in the liquid are caused to coagulate and are therefore increased in size. Thereafter, the coagulated colloidal-state particles are separated from the liquid.

In the method of the present invention, hydroxide salts are crystallized in an acid solution. Therefore, minute colloidal silica and ion particles (e.g., $(SiO_4-)n$ [n: 1 to 5]) suspended in the acid solution act as a kernel and attract one another, with the result that they are captured in the crystallized hydroxide salts. Accordingly, the $SiO_2$ content in the waste liquid can be reduced to be within the range of 3 to 4 ppm, or less. In addition, the other impurities, such as Cr, Al, and Ti, can be reduced or can be prevented from increasing. Moreover, the entire amount of the acid solution can be processed with high efficiency.

BRIEF DESCRIPTION OF THE DRAWINGS

FIG. 1 is an explanatory view illustrating the process according to the first embodiment of the present invention.

DETAILED DESCRIPTION OF THE PREFERRED EMBODIMENTS

Figure 2:
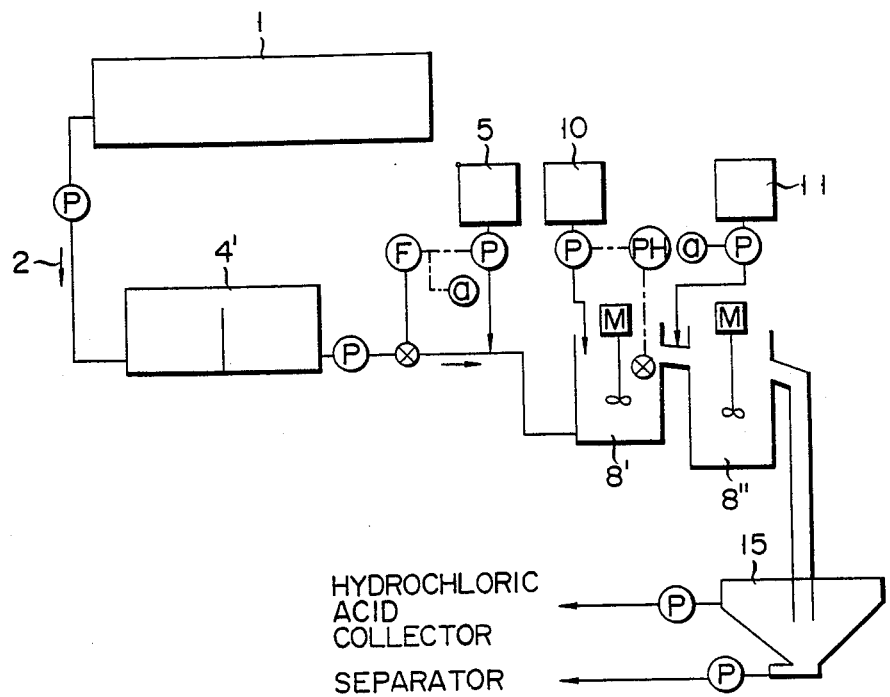
FIG. 2 is an explanatory view illustrating the process according to the second embodiment of the present invention.

Preferred embodiments of the present invention will now be described, with reference to the accompanying drawings.

Embodiment 1

FIG. 1 is an explanatory view illustrating the process according to embodiment 1 of the invention. Referring to FIG. 1, waste liquid 2, which remains after steel is washed with an acid, is discharged from steel washing tub 1. A predetermined batch of waste liquid 2 is supplied to reaction tub 4 via relay tank 3. Then, metal 5 to be added and scrap steel 6 are introduced into reaction tub 4 in amounts determined in accordance with a target rate of impurity elimination, a target pH value of neutralization, and the amount of free HCl remaining in waste liquid 2. In order to achieve efficient dissolution of metal 5 and scrap steel 6, it is preferable that the temperature of waste liquid 2 be maintained at 60° C. or higher.

After uniformly dissolving metal 5 and scrap steel 6 in waste liquid 2 and checking the pH value of waste liquid 2, waste liquid 2 is supplied from reaction tub 4 into reaction tub 8 by means of pump 7. Reaction tub 8 is provided with agitator 9 for agitating a liquid therein. In reaction tub 8, alkali solution 10 is added to waste liquid 2 such that the pH value of waste liquid 2 falls within the predetermined range of 3.5 to 6. As a result, metal 5 is crystallized and the impurities in waste liquid 2 are captured. In order to perform the crystallization and the impurity capture at high efficiency, it is important that waste liquid 2 be agitated vigorously and that the temperature of waste liquid 2 be maintained within the range of 40° to 60° C.

After the crystallizing reaction has progressed sufficiently, agitator 9 is slowed and coagulating agent 11 is then added in an amount proportional to that of metal 5 and liquid 2 combined. As a result, the crystallized components of liquid 2 are caused to coagulate and are therefore increased in size. Thereafter, agitator 9 is stopped and is kept stationary for 2 to 3 hours in order that coagulated components of liquid 2 settle sufficiently. Finally, the upper portion of liquid 2 (i.e., a refined liquid) is separated from the rest and is supplied to storage tank 13 by means of pump 12.

By repeating the above operation, the refined liquid is collected in storage tank 13. When the refined liquid has been collected in a sufficient amount, it is supplied to hydrochloric acid-recovering device 14 for the purpose of the recovery of a hydrochloric acid and the production of a high-purity iron oxide.

Table 2 below shows results of the impurity-eliminating processings performed according to embodiment 1. As can be understood from Table 2, the metal added to the waste liquid hardly remains in the finally-processed liquid, and the amount of impurities such as Si existing in the finally-processed liquid is very small.

In embodiment 1, coagulated components of liquid 2 may be settled by use of either a filtering device (i.e., a separator) or a centrifugal machine, so as to improve the settling rate.

TABLE 2

| Case | 1 | 2 |
|---|---|---|
| Added metal | | |
| Kind | Al | Cr |
| Amount | 400 ppm | 250 ppm |
| pH value after reaction of scrap iron | 3.6 | 3.4 |
| pH value after alkali neutralization | 4.2 | 4.6 |
| Crystallizing temperature | 55~65° C. | 50~60° C. |

TABLE 2-continued

| Coagulating agent | | | | |
|---|---|---|---|---|
| Kind | noionic agent | | cationic agent | |
| Amount | 20 ppm | | 15 ppm | |
| Time of setting | 3.5 hrs | | 3.5 hrs | |
| Composition of waste liquid | | | | |
| Contents (before and after refinement) | before | after | before | after |
| | % | % | % | % |
| Total Fe | 10.05 | 11.5 | 10.6 | 11.3 |
| | ppm | ppm | ppm | ppm |
| SiO₂ | 10.1 | 2 | 98 | 13 |
| Mn | 273 | 268 | 280 | 285 |
| Ti | 10 | <1 | 7 | <1 |
| Al | 48 | 8 | 51 | 5 |
| Cr | 5 | <2 | 4 | 3 |
| V | 3 | <1 | 2 | <1 |
| B | 2 | <1 | 2 | <1 |
| Zn | — | — | — | — |
| Composition of recovered iron oxide | | | | |
| Fe₂O₃ | | 99.55% | | 99.5 |
| SiO₂ | | 0.003 | | 0.011 |
| Mn | | 0.185 | | 0.199 |
| Al | | 0.004 | | 0.002 |
| Zn | | — | | — |

| Case | 3 | | 4 | |
|---|---|---|---|---|
| Added metal | | | | |
| Kind | V | | B | |
| Amount | 400 ppm | | 200 ppm | |
| pH value after reaction of scrap iron | 3.8 | | 3.5 | |
| pH value after alkali neutralization | 5.2 | | 3.9 | |
| Crystallizing temperature | 45~63° C. | | 48~59° C. | |
| Coagulating agent | | | | |
| Kind | cationic agent + noionic agent | | cationic agent | |
| Amount | 25 ppm | | 15 ppm | |
| Time of setting | 4 hrs | | 2.5 hrs | |
| Composition of waste liquid | | | | |
| Contents (before and after refinement) | before | after | before | after |
| | % | % | % | % |
| Total Fe | 10.3 | 11.6 | 10.8 | 11.1 |
| | ppm | ppm | ppm | ppm |
| SiO₂ | 106. | 6 | 110. | 4 |
| Mn | 271 | 260 | 281 | 286 |
| Ti | 8 | <1 | 6 | <1 |
| Al | 45 | 4 | 49 | 10 |
| Cr | 5 | <2 | 6 | 3 |
| V | 3 | 4 | 3 | 2 |
| B | <1 | <1 | 2 | 3 |
| Zn | — | — | — | — |
| Composition of recovered iron oxide | | | | |
| Fe₂O₃ | | 99.53% | | 99.48 |
| SiO₂ | | 0.007 | | 0.005 |
| Mn | | 0.180 | | 0.191 |
| Al | | 0.002 | | 0.006 |
| Zn | | — | | — |

| Case | 5 |
|---|---|
| Added metal | |
| Kind | Zn |
| Amount | 300 ppm |
| pH value after reaction of scrap iron | 3.3 |
| pH value after alkali neutralization | 4.9 |
| Crystallizing temperature | 46~54° C. |
| Coagulating agent | |
| Kind | anionic agent + noionic agent |
| Amount | 20 ppm |
| Time of setting | 4 hrs |
| Composition of waste liquid | |
| Contents (before and after refinement) | before / after |
| Total Fe | 10.5% / 11.8% |
| SiO₂ | 11.3 ppm / 6 ppm |
| Mn | 283 / 289 |
| Ti | 7 / <1 |
| Al | 44 / 8 |
| Cr | 4 / 3 |
| V | 3 / 1 |
| B | 2 / <1 |
| Zn | <1 / 2 |
| Composition of recovered iron oxide | |
| Fe₂O₃ | 99.51% |
| SiO₂ | 0.006 |
| Mn | 0.179 |
| Al | 0.003 |
| Zn | 0.002 |

Embodiment 2

FIG. 2 is an explanatory view illustrating the process according to embodiment 2 of the present invention, which process employs a continuous processing device. According to embodiment 2, scrap steel reacting/neutralizing tub 4' for dealing with a variation of the liquid amount contained in steel washing tub 1 is employed, so as to enable reliable impurity-eliminating processings. In addition, the amounts of metal 5 and coagulating agent 11 to be added to a waste liquid are controllable in proportion to the flow rate of the liquid whose pH value has been made constant. Furthermore, a metal is dissolved in an acid solution beforehand and this acid solution is added to the waste liquid. Therefore, the amount of metal to be added can be easily controlled, and uniform dissolution of the added metal is easy. Still further, crystallization and coagulation are carried out by use of different tubs, i.e., crystallization tub 8' and coagulation tub 8". Except for these points, the process according to embodiment 2 are similar to that according to embodiment 1.

Results of the operation performed according to embodiment 2 are shown in Table 3 below. As can be understood from Table 3, the amount of impurities such as Si existing in the finally-processed liquid is very small.

TABLE 3

| Case | 1 | | 2 | |
|---|---|---|---|---|
| Flow rate of waste liquid | 5.5 m³/hr | | 5.5 m³/hr | |
| pH value after reaction of scrap iron | 3.6 | | 3.4 | |
| Al-Hydrochloric solution | 50 l/hr | | 95 l/hr | |
| Amount of ammonia added | 135 l/hr | | 195 l/hr | |
| pH value for crystallization | 4.2 | | 4.3 | |
| Solution of coagulating agent | | | | |
| Kind | cationic agent | | noionic agent | |
| Amount | 50 l/hr | | 70 l/hr | |
| Composition of waste liquid | | | | |
| Content (before and after refinement) | before | after | before | after |

TABLE 3-continued

| Case | 1 | | 2 | |
|---|---|---|---|---|
| | ppm | ppm | ppm | ppm |
| $SiO_2$ | 105 | 8 | 102 | 2 |
| Al | 46 | 5 | 49 | 8 |
| Composition of recovered iron oxide | | | | |
| $Fe_2O_3$ | | 99.49% | | 99.51% |
| $SiO_2$ | | 0.009 | | 0.003 |
| Mn | | 0.189 | | 0.179 |
| Al | | 0.003 | | 0.005 |
| Recovery rate of hydrochloric acid* | | 94.5% | | 94.1% |

*Recovery rate of hydrochloric acid if refinement is not performed: 96%

What is claimed is:

1. A method of refining a ferrous ion-containing acid solution, said method comprising the steps of:
    a first step of adding at least one metal selected from the group consisting of Al, Cr, V, B, and Zn or an acid solution of said metal to a ferrous ion-containing acid solution, and dissolving said metal or the acid solution thereof uniformly in the ferrous ion-containing acid solution;
    a second step of adding alkali solution to the ferrous ion-containing acid solution obtained by said first step, thereby neutralizing the acid solution to a pH value of 3.5 to 6 and crystallizing a hydroxide of said metal; and
    a third step of adding at least one of an anionic and a nonionic coagulant to the neutralized acid solution obtained by said second step, thereby coagulating and precipitating the crystallized hydroxide of said metal.

2. A method according to claim 1, wherein the acid solution has a ferrous ion content of 5% by weight or more.

3. A method according to claim 2, wherein the ferrous ion-containing acid solution is a waste liquid which remains after steel is washed with a hydrochloric acid.

4. A method according to claim 1, wherein the hydroxide of said metal is crystallized by polymerization of the impurity particles and oxide ions dissolved in the solution.

5. The method of claim 1, wherein the ferrous containing acid solution is maintained at a temperature of 40° C. to 60° C. during the neutralizing step whereby the crystallization takes place at high efficiency.

6. The method of claim 5 further comprising agitating the ferrous containing acid solution during the neutralization step.

7. The method of claim 6 further comprising a fourth step of removing the precipitated hydroxide from the neutralized acid solution by filtering.

8. The method of claim 6 further comprising a fourth step of removing the precipitated hydroxide from the neutralized acid solution by centrifuging.

9. The method of claim 1 further comprising agitating the ferrous containing acid solution during the neutralization step.

10. The method of claim 9 further comprising a fourth step of removing the precipitated hydroxide from the neutralized acid solution by filtering.

11. The method of claim 1 further comprising a fourth step of removing the precipitated hydroxide from the neutralized acid solution by centrifuging.

* * * * *